(12) United States Patent
Ohnishi et al.

(10) Patent No.: US 10,526,497 B2
(45) Date of Patent: Jan. 7, 2020

(54) PLATING METHOD

(71) Applicant: MIMAKI ENGINEERING CO., LTD., Nagano (JP)

(72) Inventors: Masaru Ohnishi, Nagano (JP); Toshiya Ito, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 59 days.

(21) Appl. No.: 15/599,473

(22) Filed: May 19, 2017

(65) Prior Publication Data

US 2017/0342565 A1    Nov. 30, 2017

(30) Foreign Application Priority Data

May 27, 2016  (JP) .................................. 2016-106601
Mar. 16, 2017  (JP) .................................. 2017-051764

(51) Int. Cl.
*C09D 11/101*    (2014.01)

(52) U.S. Cl.
CPC .................................. *C09D 11/101* (2013.01)

(58) Field of Classification Search
None
See application file for complete search history.

(56) References Cited

U.S. PATENT DOCUMENTS

| 4,451,145 A * | 5/1984 | Fromson | ............... G03F 7/2024 |
| | | | 101/467 |
| 2006/0257633 A1* | 11/2006 | Inoue | .................. C23C 18/1605 |
| | | | 428/195.1 |
| 2011/0240350 A1* | 10/2011 | Meinder | ............... B82Y 10/00 |
| | | | 174/258 |

FOREIGN PATENT DOCUMENTS

JP    2007057749    3/2007

* cited by examiner

*Primary Examiner* — Shamim Ahmed
*Assistant Examiner* — Bradford M Gates
(74) *Attorney, Agent, or Firm* — JCIPRNET (57) ABSTRACT

The present invention provides a plating method capable of easily performing various decorative plating processes. The plating method includes a bulge forming process of forming a bulge on an object to be plated by ejecting ink drops of first UV-curable ink from an inkjet head such that the ejected ink drops land on the object, and a plating process of plating the object having the bulge formed thereon, after the bulge forming process. Also, in the bulge forming process, the bulge is formed such that a second surface of the bulge to be plated has surface roughness different from that of a first surface of the object to be plated.

11 Claims, 7 Drawing Sheets

PLATING METHOD

CROSS-REFERENCE TO RELATED APPLICATIONS

This application claims the priority benefit of Japanese application serial no. 2016-106601, filed on May 27, 2016 and Japanese application serial no. 2017-051764, filed on Mar. 16, 2017. The entirety of each of the above-mentioned patent application is hereby incorporated by reference herein and made a part of this specification.

BACKGROUND OF THE INVENTION

1. Technical Field

The present invention relates to a plating method of performing a plating process on objects.

2. Related Art

In the related art, as plating methods of performing plating processes on objects, methods of depositing metal layers on substrates by forming photoresist patterns on the substrates using photomasks and performing electroless plating processes using the formed photoresist patterns as photomasks are known (see Japanese Patent Application Laid-Open No. 2007-57749 for instance).

According to those methods such as the plating method disclosed in JP-A-2007-57749, in a case of performing a plating process on an object such as a substrate, the surface of a coating layer formed on the object has uniform gloss. In above-described methods, in a case of plating objects such that the surfaces of the objects have uneven gloss in order to improve decorativeness, the surfaces of the objects are embossed with hubbly plates, and then are plated. In this case, since hubbly plates are used in embossing processes, it is difficult to easily change shapes to be embossed on the surfaces of objects. Therefore, the above-described methods are not suitable for small lot production of a variety of products.

The present invention was made in view of the above described circumstances, and an object of the present invention is to provide a plating method capable of easily performing various decorative plating processes.

SUMMARY OF THE INVENTION

A plating method of the present invention includes: a bulge forming process of forming a bulge on an object to be plated by ejecting first ink drops of first UV-curable ink from a first inkjet head such that the ejected first ink drops land on the object; and a plating process of plating the object having the bulge formed thereon, after the bulge forming process.

According to this configuration, it is possible to make the glossiness of the surface of the part of the coating layer formed on the bulge different from the glossiness of the surface of the other part of the coating layer formed on the part of the object other than the bulge. For example, it is possible to make the surface of the part of the coating layer formed on the bulge matt and make the surface of the other part of the coating layer formed on the part of the object other than the bulge glossy. Therefore, it is possible to improve the decorativeness of the object by plating. In this configuration, bulges can be formed in an inkjet scheme. Therefore, it is possible to easily form various images. As a result, it is possible to easily perform various decorative plating processes.

Also, in the bulge forming process, the bulge may be formed such that a second surface of the bulge to be plated has surface roughness different from that of a first surface of the object to be plated.

According to, this configuration, it is possible to make the surface roughness of the first surface of the object different from that of the second surface of the bulge. Therefore, even in a case of plating the first surface and the second surface at the same time, it is possible to make the glossiness of the surface of the part of the coating layer formed on the bulge different from the glossiness of the surface of the other part of the coating layer formed on the part of the object other than the bulge.

Also, the plating method may further include: a mask forming process of forming a plating mask on the object by ejecting second ink drops of second UV-curable ink from a second inkjet head such that the ejected second ink drops land on the object; and a mask removing process of removing the plating mask from the object, after the plating process.

According to this configuration, it is possible to form plating masks on objects in an inkjet scheme. Therefore, it is possible to easily form plating masks at the same time as formation of bulges. In short, since it is possible to appropriately form plating masks so as to expose some parts of bulges and some parts of objects to be plated and cover some parts of the bulges and some parts of the objects to be protected from plating, it is possible to further improve decorativeness. Also, the first inkjet head and the second inkjet head are not particularly limited. They may be components of one unit, or may be separate components.

Also, in the plating process, the object may be dipped in a plating solution, and in the mask removing process, the plating mask may be removed with an organic solvent for mask removal, and the first UV-curable ink may be insoluble in the plating solution and the organic solvent for mask removal, and the second UV-curable ink may be insoluble in the plating solution but is soluble in the organic solvent for mask removal.

According to this configuration, since the bulge is insoluble in the plating solution and the organic solvent for mask removal, it is possible to appropriately leave the bulge on the object. Also, since the plating mask is insoluble in the plating solution, it is possible to appropriately leave the plating mask on the object during plating. Meanwhile, since the plating mask is soluble in the organic solvent for mask removal, it is possible to appropriately remove the plating mask from the object during mask removal.

Also, the plating method may further include a heating process of heating the object having the bulge formed thereon, thereby removing an internal stress of the bulge, after the bulge forming process and before the plating process.

According to this configuration, it is possible to remove the residual internal stress of the bulge formed in the bulge forming process, in advance, before the plating process. In the plating process, releasing of the internal stress attributable to a rise in the temperature of the object may deform the bulge. Such deformation may cause the coating layer to partially peel off from the object. However, by performing the heating process, it is possible to suppress such a problem.

Also, in the heating process, the object may be heated at a temperature lower than a glass-transition temperature of the first UV-curable ink.

In the heating process, if the temperature of the first UV-curable ink becomes equal to or higher than the glass-transition temperature, the bulge may be deformed. However, according to the above-described configuration, it is possible to keep the bulge in a desired shape.

Also, the bulge forming process may include: a semi-hardened-layer forming process of semi-hardening the first UV-curable ink by irradiation with ultraviolet light, thereby forming a semi-hardened layer; and a completely-hardened-layer forming process of completely hardening the semi-hardened layer and the first UV-curable ink attached on the semi-hardened layer at the same time by irradiation with ultraviolet light having intensity higher than that in the semi-hardened-layer forming process, thereby forming a completely hardened layer.

According to this configuration, since it is possible to form the semi-hardened layer so as to be smooth by semi-hardening the first UV-curable ink, it is possible to form the completely hardened layer so as to be smooth by completely hardening the semi-hardened layer and the first UV-curable ink attached on the semi-hardened layer at the same time. As a result, it is possible to improve the shiny appearance (glossy appearance) of the plated bulge. Also, in the case of completely hardening the semi-hardened layer and the first UV-curable ink attached on the semi-hardened layer at the same time, the internal stress of the bulge is likely to remain. However, if the heating process is performed before the plating process, thereby removing the internal stress of the bulge in advance, it is possible to suppress the internal stress from causing the coating to partially peel off. In other words, the heating process is suitable in the case of performing the bulge forming process including the semi-hardened-layer forming process and the completely-hardened-layer forming process.

DETAILED DESCRIPTION OF PREFERRED EMBODIMENTS

Hereinafter, embodiments according to the present invention will be described in detail with reference to the accompanying drawings. However, the present invention is not limited to the following embodiments. Also, components of the following embodiments include ones which can be used instead of them by those skilled in the art, and ones which are substantially the same as them. Further, the following components can be appropriately combined, and the embodiments also can be combined.

First Embodiment

Figure 1:
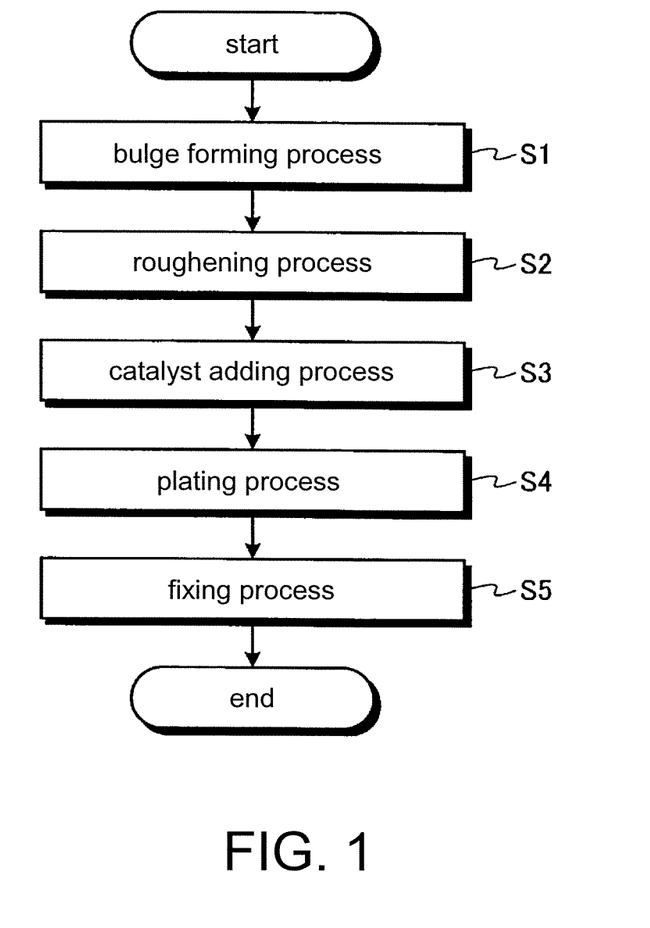
FIG. 1 is a flow chart illustrating a plating method according to a first embodiment.
Figure 2:
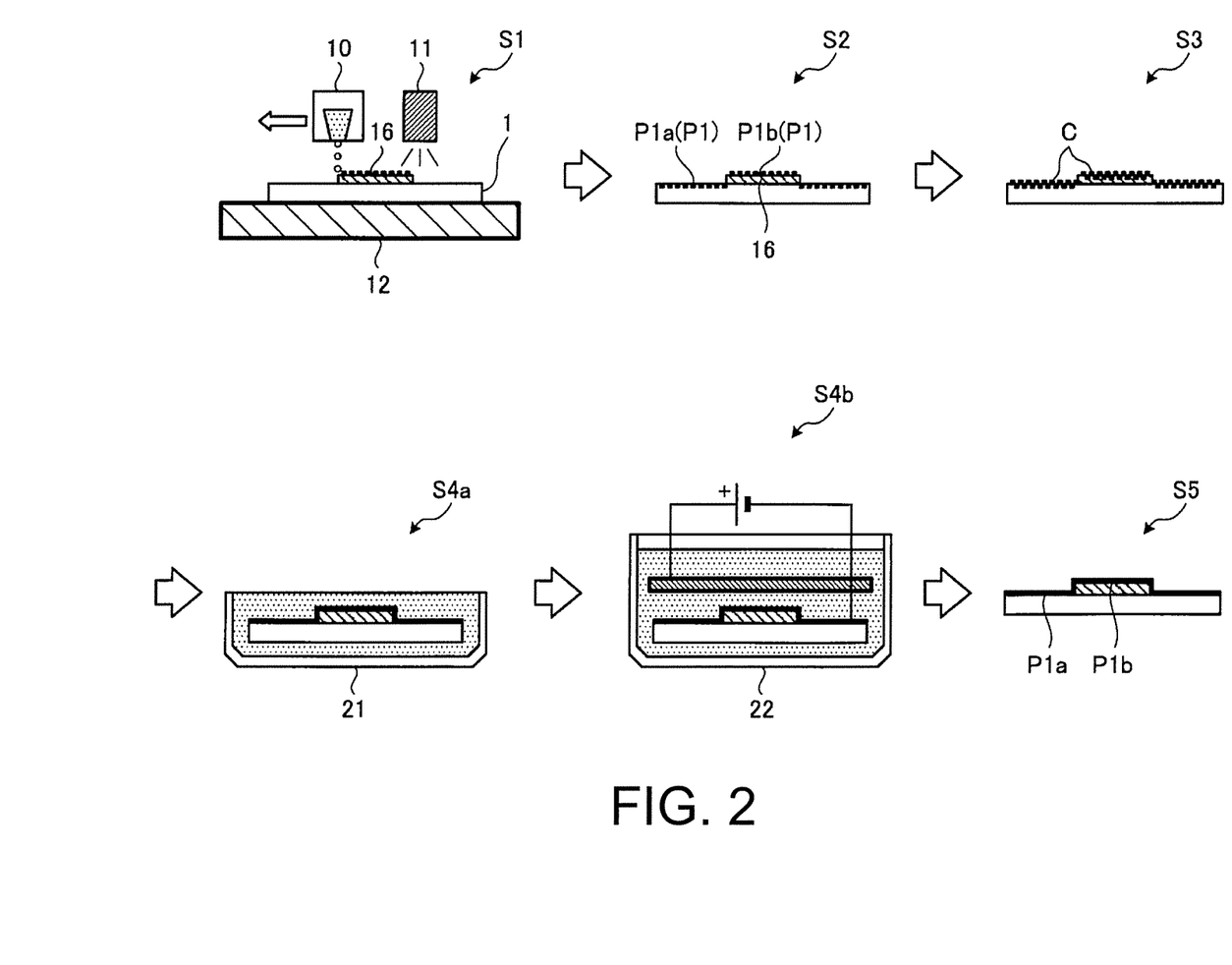
FIG. 2 is an explanatory view illustrating the plating method according to the first embodiment.

A plating method according to a first embodiment forms bulges on objects to be plated by inkjet printing, and performs a plating process on the objects having the bulges. Hereinafter, the plating method will be described with reference to FIGS. 1 and 2. FIG. 1 is a flow chart illustrating the plating method according to the first embodiment. FIG. 2 is an explanatory view illustrating the plating method according to the first embodiment.

Prior to a description of the plating method, first, objects 1 to be plated will be described. As the materials of objects 1, materials such as resins, metals, and glass can be applied, and any other materials can also be applied as long as the corresponding material can be plated. Also, as the shapes of objects 1, a plate shape, a three-dimensional shape having a curved surface, and so on can be applied, and any other shapes can also be applied as long as objects having the corresponding shapes can be plated. Hereinafter, a case where cards made of a resin are used as objects 1 will be described.

As shown in FIG. 1, the plating method of the first embodiment sequentially performs a bulge forming process S1, a roughening process S2, a catalyst adding process S3, a plating process S4, and a fixing process S5. Also, the plating method needs only to perform at least the bulge forming process S1 and the plating process S4, and thus each of the other processes may be appropriately omitted.

The bulge forming process S1 is a process of ejecting ink drops (first ink drops) of first UV-curable ink from an inkjet head (a first inkjet head) 10, such that the ejected ink drops land on an object 1 to be plated, and hardening the first UV-curable ink by ultraviolet light, thereby forming a bulge 16 on the object 1.

Now, the first UV-curable ink which is used in the bulge forming process S1 of the first embodiment will be described. In the first embodiment, as the first UV-curable ink, ink insoluble in a plating solution which is used in the plating process S4 is used. The first UV-curable ink contains at least a compound to be a UV-curable resin by polymerization, and an initiator. As the compound to be the UV-curable resin by polymerization, for example, a monomer or an oligomer can be used. Also, the first UV-curable ink may contain a color material so as to have the same color as that of the object 1. If the first UV-curable ink is irradiated with ultraviolet light, the initiator becomes active and reacts with a monomer, whereby the first UV-curable ink hardens.

As shown in FIG. 2, in the bulge forming process S1, the inkjet head 10 ejects the first UV-curable ink onto the object 1 while moving in a main scan direction and in a sub san direction, such that a predetermined pattern (image) is formed. In the present embodiment, the front surface of the object 1 has a surface to be plated (a first surface P1a to be plated) (see S2 of FIG. 2), and on a part of the surface of the object 1, the image is formed with the first UV-curable ink. At this time, the object 1 is heated by a platen heater 12 provided below the rear surface of the object 1.

Also, in the bulge forming process S1, the image formed with the first UV-curable ink is irradiated with ultraviolet light from an ultraviolet-light radiating unit 11 such that the image hardens, whereby the bulge 16 is formed. The front surface of the bulge 16 is a surface to be plated (a second surface P1b to be plated) (see S2 of FIG. 2).

At this case, in the bulge forming process S1, the bulge 16 is formed such that the second surface P1b of the bulge 16 has surface roughness different from that of the first surface P1a of the object 1. Specifically, the first surface P1a of the object 1 is a smooth surface; whereas since the bulge 16 is formed by hardening a plurality of ink drops with ultraviolet light, the second surface P1b is rougher than the first surface P1a.

In the roughening process S2, a surface P1 of the object 1 having the bulge 16 formed thereon is roughened. The surface P1 includes the first surface P1a and the second surface P1b. In the roughening process S2, surface modification is performed, for example, by etching the first surface P1a and the second surface P1b with an etching solution such that the first surface P1a and the second surface P1b become rough. Also, as the etching solution, an etching solution appropriate for the object 1 and the bulge 16 is used. Alternatively, in the roughening process S2, surface modification may be performed, for example, by sandblasting the first surface P1a and the second surface P1b such that the first surface P1a and the second surface P1b become rough. As described above, in the roughening process S2, the first surface P1a and the second surface P1b are roughened, whereby coating adhesion is improved.

In the catalyst adding process S3, a catalyst C is attached to the rough first surface P1a and the rough second surface P1b. Also, in the first embodiment, since the object 1 and the bulge 16 are made of a resin, the catalyst C is attached in order to deposit a coating in the subsequent process, that is, the plating process S4. However, in a case where the object 1 is made of a metal, the catalyst adding process S3 may be omitted. In the catalyst adding process S3, the object 1 is dipped alternately in a solution of tin(II) chloride and a solution of palladium chloride, such that the object absorbs catalysts $Sn^{2+}$ and $Pd^{2+}$, and $Sn^{2+}$ is removed. In this way, palladium (Pd) is deposited.

Alternatively, as an alternative of the roughening process S2 and the catalyst adding process S3, a process of imparting conductivity to the object 1 by performing spraying or the like may be performed before the plating process S4 is performed.

In the plating process S4, the object 1 with the bulge 16'having the catalyst C attached thereon is plated. In the plating process S4, an electroless plating process S4a of electrolessly plating the object 1 is performed. In the electroless plating process S4a, electroless plating is performed by dipping the object 1 in an electroless plating solution having a predetermined temperature and stored in an electroless plating tank 21 for a predetermined time. Also, the electroless plating solution may contain particles of diamond or titanium oxide, and the electroless plating process S4a may be repeatedly performed.

Also, as shown in FIG. 2, in addition to the electroless plating process S4a, an electroplating process S4b may be performed. In the electroplating process S4b, electroplating is performed by negatively charging the surface (the coating layer) of the electrolessly plated object 1 and dipping the object in the plating solution stored in an electroplating tank 22.

In the object 1 subjected to the plating process S4, the surface of the part of the coating layer formed on the rough second surface P1b of the bulge 16 is matt, and the surface of the part of the coating layer formed on the smooth first surface P1a of the object 1 is glossy.

In the fixing process S5, the plated object 1 is heated in a heating chamber (not shown in the drawings), whereby the coating is fixed to the object 1. In the first embodiment, the fixing process S5 is performed in order to sufficiently fix the coating to the object 1. However, in a case where the adhesion of the coating to the object 1 is sufficiently secured in the plating process S4, after the plating solution is washed, the object 1 may be dried, without performing the fixing process S5.

As described above, according to the first embodiment, since it is possible to make the glossiness of the surface of the part of the coating layer formed on the bulge 16 different from the glossiness of the surface of the other part of the coating layer formed on the part of the object 1 other than the bulge 16, it is possible to improve the decorativeness of the object 1 by plating. In the first embodiment, it is possible to form the bulge 16 in an inkjet scheme. Therefore, it is possible to easily form various images. Therefore, it is possible to easily perform various decorative plating processes.

Also, according to the first embodiment, it is possible to make the roughness of the first surface P1a of the object 1 different from the roughness of the second surface P1b of the bulge 16. Therefore, even in a case where the first surface P1a and the second surface P1b are plated at the same time, it is possible to make the glossiness of the surface of the part of the coating layer formed on the bulge 16 different from the glossiness of the surface of the other part of the coating layer formed on the part of the object 1 other than the bulge 16.

Second Embodiment

Figure 3:
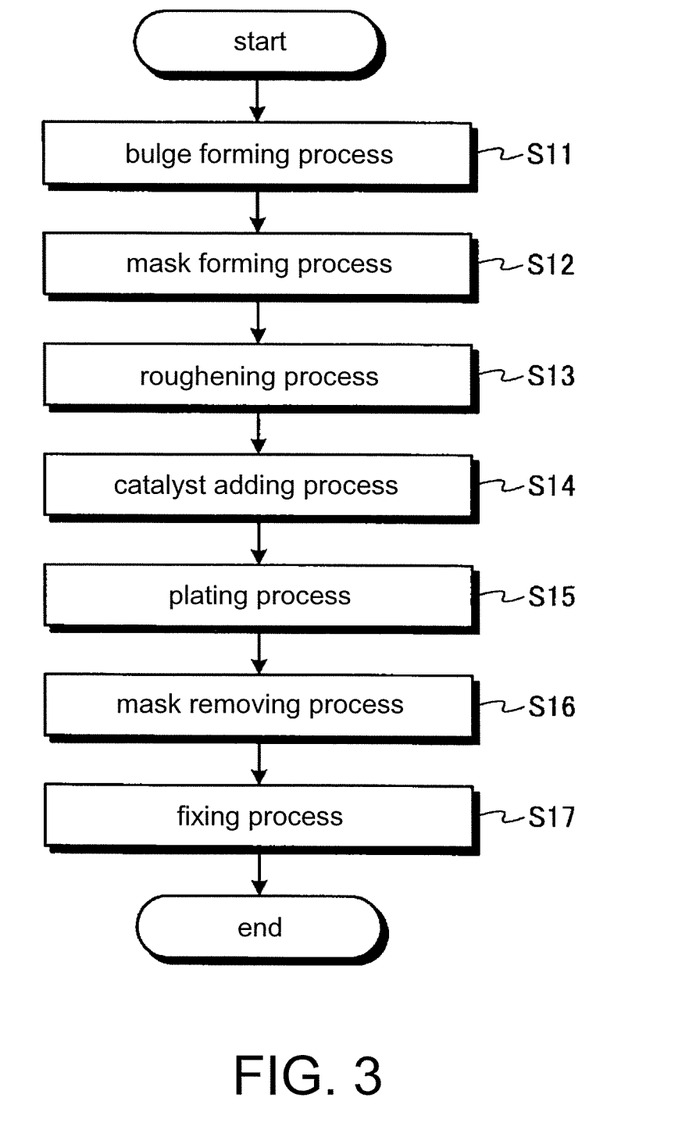
FIG. 3 is a flow chart illustrating a plating method according to a second embodiment.
Figure 4:
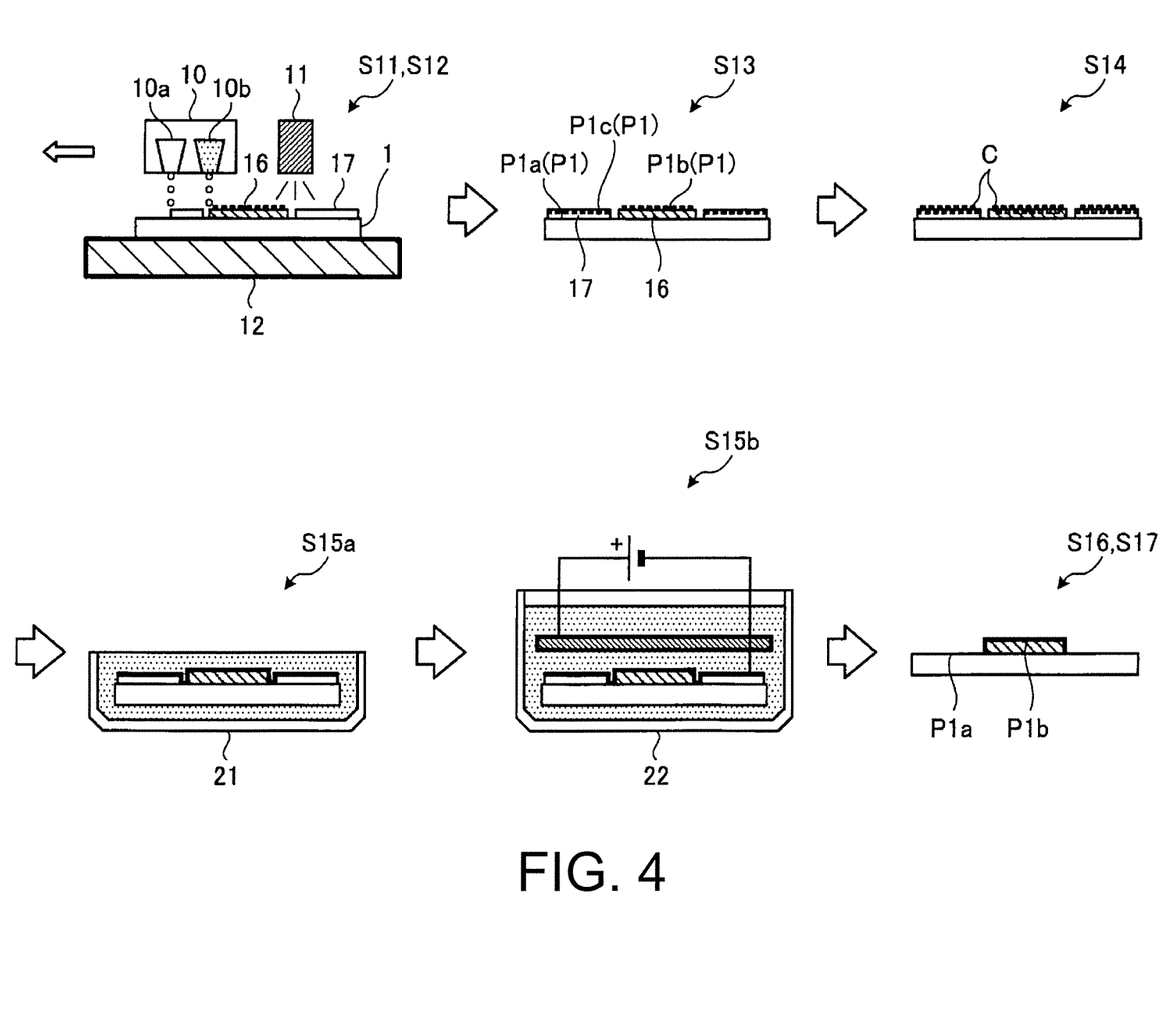
FIG. 4 is an explanatory view illustrating the plating method according to the second embodiment.

Now, with reference to FIGS. 3 and 4, a plating method according to a second embodiment will be described. However, in the second embodiment, in order to avoid a repeated description, parts different from those of the first embodiment will be described, and parts having the same configurations as those of the first embodiment will be denoted by the same reference symbols, and will be described. FIG. 3 is a flow chart illustrating the plating method according to the second embodiment. FIG. 4 is an explanatory view illustrating the plating method according to the second embodiment.

The plating method of the second embodiment forms a bulge 16 and a plating mask 17 on an object 1 by inkjet printing, and plates the object 1 having the bulge 16 and the plating mask 17 formed thereon, and then removes the plating mask 17.

As shown in FIG. 3, the plating method of the second embodiment sequentially performs a bulge forming process S11, a mask forming process S12, a roughening process S13, a catalyst adding process S14, a plating process S15, a mask removing process S16, and a fixing process S17. However, the plating method needs only to perform at least the bulge forming process S11, the mask forming process S12, the plating process S15, and the mask removing process S16, and thus each of the other processes may be appropriately omitted.

The bulge forming process S11 is a process identical to the bulge forming process S1 of the first embodiment, and is a process of forming a bulge 16 on an object 1 to be plated by ejecting ink drops of first UV-curable ink from an inkjet head (a first inkjet head) 10a such that the ejected ink drops land on the object 1 and hardening the first UV-curable ink with ultraviolet light. Also, the bulge forming process S11 is performed at the same time as the mask forming process S12.

The mask forming process S12 is a process of forming a plating mask 17 on the object 1 by ejecting ink drops (second ink drops) of second UV-curable ink from an inkjet head (a second inkjet head) 10b such that the ejected ink drops land on the object 1 and hardening the second UV-curable ink with ultraviolet light. In the present embodiment, the inkjet head 10a which is used in the bulge forming process S11 and the inkjet head 10b which is used in the mask forming process S12 are components of one unit.

Now, the second UV-curable ink which is used in the mask forming process S12 of the second embodiment will be described. In the second embodiment, as the second UV-curable ink, ink insoluble in a plating solution which is used in the plating process S15 but soluble in an organic solvent (for coating removal) which is used in the mask removing process S16 is used. Also, as the first UV-curable ink, ink insoluble in the plating solution and the organic solvent is used.

Specifically, the second UV-curable ink is ink containing concentrated UV ink and a solvent-soluble resin which is an additive. The concentrated UV ink contains at least a compound to be a UV-curable resin by polymerization, and an initiator. As the compound to be the UV-curable resin by polymerization, for example, a monomer or an oligomer can be used. If the second UV-curable ink is irradiated with ultraviolet light, the initiator becomes active and reacts with a monomer or the like, whereby the second UV-curable ink hardens.

The solvent-soluble resin is a resin insoluble in the plating solution which is used in the plating process S15 but soluble in the organic solvent such as propyl alcohol which is used in the mask removing process S16. Specifically, the solvent-soluble resin is a resin containing at least one of butyral resins and vinyl chloride-vinyl acetate copolymers. Butyral resins and vinyl chloride-vinyl acetate copolymers have adhesion. Therefore, it is possible to improve adhesion of the plating mask 17 which is formed on the object 1 in the mask forming process S12. Also, the ratio of the solvent-soluble resin to the total weight of the second UV-curable ink is between 20 percent by weight and 70 percent by weight.

Also, as the solvent-soluble resin, it is only necessary to appropriately select a butyral resin or a vinyl chloride-vinyl acetate copolymer according to the material of the object 1, and it is more preferable to use a butyral resin which is easily dissolved in an organic solvent such as ethanol.

Also, as the second UV-curable ink, solvent-soluble SUV-curable ink (hereinafter, referred to as SUV ink) further containing an organic solvent may be used. In other words, the SUV ink (solvent UV ink) is ink containing a solvent-soluble resin, an organic solvent, and concentrated UV ink. The SUV ink is obtained by adding the solvent-soluble resin and the organic solvent to the concentrated UV ink having viscosity in a range between 10 mPa·sec and 100000 mPa·sec, such that the ratio of the solvent-soluble resin to the total weight of the SUV ink falls within a range between 20 percent by weight and 70 percent by weight and the ratio of the organic solvent to the total weight of the SUV ink falls within a range between 30 percent by weight and 80 percent by weight. Also, the ratios of the concentrated UV ink, the solvent-soluble resin, and the organic solvent to the SUV ink are adjusted such that the sum thereof becomes 100 percent by weight. In this case, as the organic solvent, for example, cellosolve acetate is used.

As shown in FIG. 4, in the mask forming process S12, an inkjet head 10 ejects the second UV-curable ink onto the object 1 while moving in a main scan direction and in a sub san direction, such that a predetermined pattern is formed. In this process, on a part of the surface of the object 1, a plating mask 17 is formed. At this time, since a platen heater 12 is below the rear surface of the object 1, in the case where the second UV-curable ink contains the organic solvent, the organic solvent vaporizes, whereby the thickness of the plating mask 17 decreases.

Also, in the mask forming process S12, the pattern formed with the second UV-curable ink is irradiated with ultraviolet light from an ultraviolet-light radiating unit 11 such that the pattern hardens, whereby the plating mask 17 is formed.

In the present embodiment, as shown in FIG. 4, in the mask forming process S12, the plating mask 17 is formed so as to neighbor the edge part of the bulge 16 (the border part of the bulge 16 and the object 1) with a small gap. This is for making it possible to plate even the edge part of the bulge 16 in the plating process S15.

In the roughening process S13, the surface P1 of the object 1 having the bulge 16 and the plating mask 17 is roughened. In other words, in the roughening process S13, a surface P1c of the plating mask 17 formed on the first surface P1a, the second surface P1b of the bulge 16, and the part of the first surface P1a where the bulge 16 and the plating mask 17 have not been formed (the small gap part between the bulge 16 and the plating mask 17) are roughened. The roughening process S13 is identical to the roughening process S2 of the first embodiment, and thus will not be described.

In the catalyst adding process S14, the catalyst C is attached to the object 1 having the bulge 16 and the plating mask 17 and subjected to roughening. The catalyst adding process S14 also is identical to the catalyst adding process S3 of the first embodiment, and thus will not be described.

The plating process S15 plates the object 1 having the bulge 16 and the plating mask 17 and having the catalyst C attached thereon. The plating process S15 also is identical to the plating process S4 of the first embodiment, and thus will not be described.

The mask removing process S16 removes the plating mask 17 from the plated object 1. In the mask removing process S16, since the second UV-curable ink used to form the plating mask 17 is solvent-soluble ink, for example, the object is dipped in an organic solvent such as alcohol (an organic solvent for coating removal), whereby the plating mask 17 is dissolved, thereby being removed. Specifically, in the mask removing process S16, the object 1 is dipped in propyl alcohol heated to a predetermined temperature.

The object 1 subjected to the mask removing process S16 has a matt coating only on the rough second surface P1b of the bulge 16, and on the smooth first surface P1a of the object 1, there is no coating.

After the plating mask 17 is removed, in the fixing process S17, the object 1 is heated in a heating chamber (not shown in the drawings), whereby the coating is fixed to the object 1. In the second embodiment, the fixing process S17 is performed in order to sufficiently fix the coating to the object 1. However, in a case where the adhesion of the coating to the object 1 is sufficiently secured in the plating process S15, after the organic solvent attached in the mask removing process S16 is washed, the object 1 may be dried, without performing the fixing process S17.

As described above, according to the second embodiment, it is possible to form the plating mask 17 on the object 1 by the inkjet head 10. Therefore, it is possible to easily form the plating mask 17 at the same time as formation of the bulge 16. In short, since it is possible to appropriately form plating masks so as to expose some parts of bulges 16 and some parts of objects 1 to be plated and cover some parts of the bulges 16 and some parts of the objects 1 to be protected from plating, it is possible to further improve decorativeness.

Also, since the bulge 16 is insoluble in the plating solution and the organic solvent, it is possible to appropriately leave the bulge 16 on the object 1. Further, since the plating mask 17 is insoluble in the plating solution, it is possible to appropriately leave the plating mask 17 on the object 1 during plating. Meanwhile, since the plating mask 17 is soluble in the organic solvent, it is possible to appropriately remove the plating mask 17 from the object 1 during mask removal.

Also, in the second embodiment, the plating mask 17 is formed on the surface of the object 1. However, on the surface of the bulge 16, a plating mask 17 may be formed.

Third Embodiment

Figure 5:
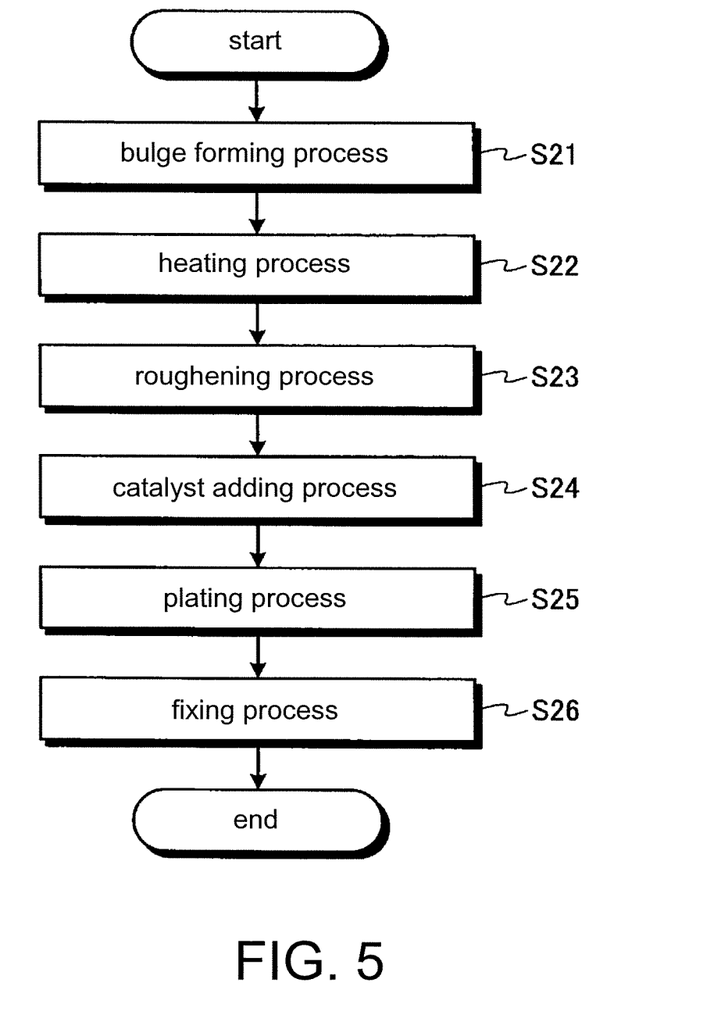
FIG. 5 is a flow chart illustrating a plating method according to a third embodiment.

Now, a plating method according to a third embodiment will be described. However, in the third embodiment, in order to avoid a repeated description, parts different from those of the first embodiment will be described, and parts having the same configurations as those of the first embodiment will be denoted by the same reference symbols, and will be described. FIG. 5 is a flow chart illustrating the plating method according to the third embodiment.

As shown in FIG. 5, the plating method of the third embodiment sequentially performs a bulge forming process S21, a heating process S22, a roughening process S23, a catalyst adding process S24, a plating process S25, and a fixing process S26. However, the plating method needs only to perform at least the bulge forming process S21, the heating process S22, and the plating process S25, and thus each of the other processes may be appropriately omitted.

Figure 6:
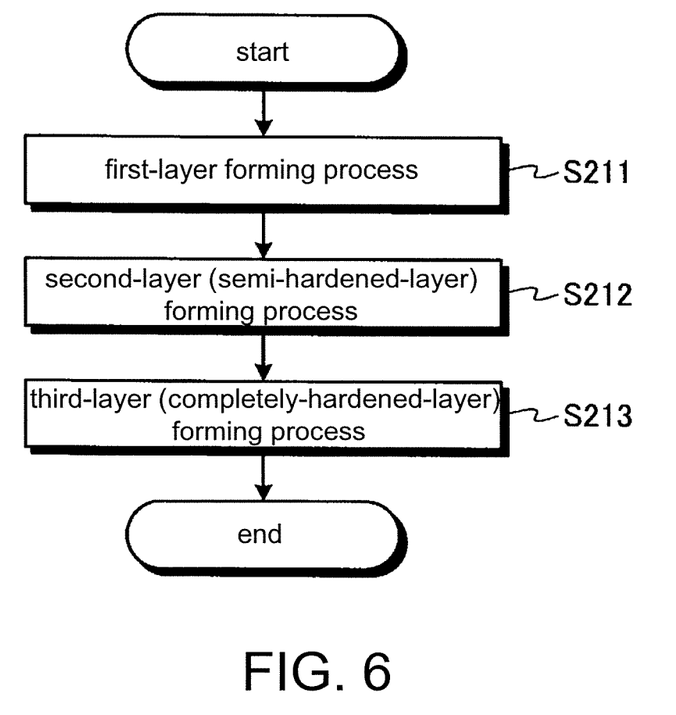
FIG. 6 is a flow chart illustrating a bulge forming process of the plating method according to the third embodiment.
Figure 7:
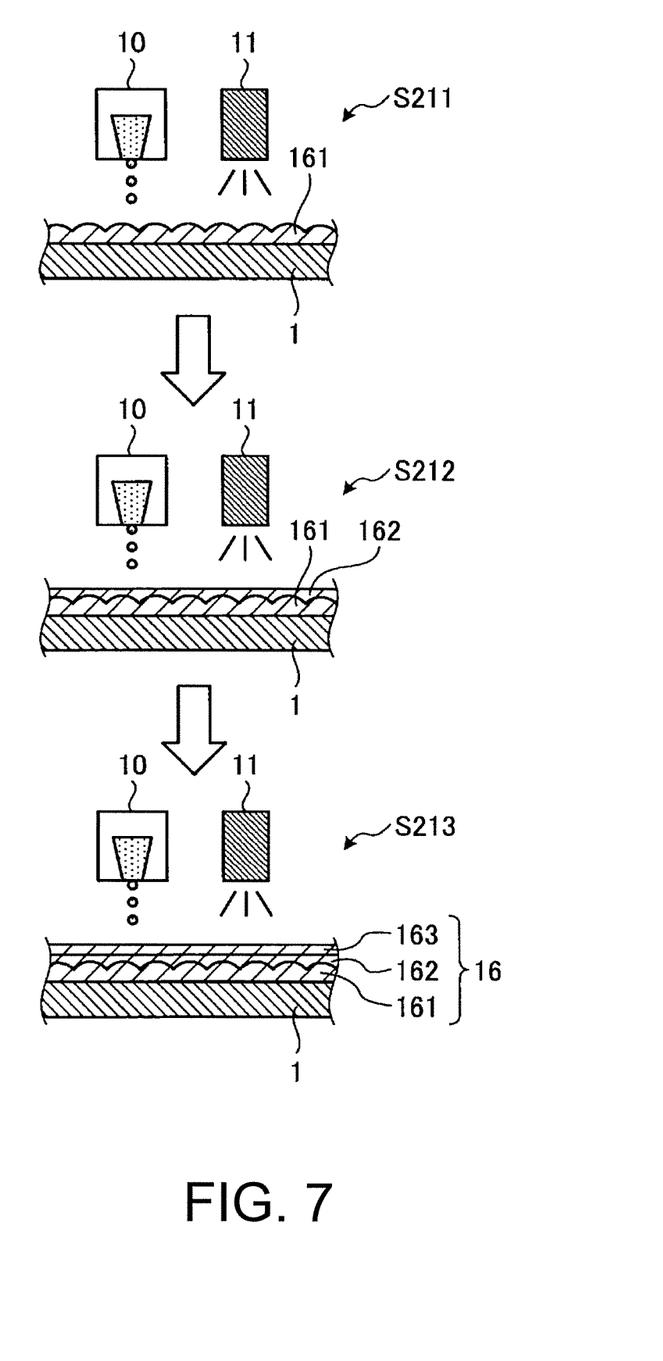
FIG. 7 is an explanatory view illustrating the bulge forming process of the plating method according to the third embodiment.

The bulge forming process S21 is a process of forming a bulge 16 on an object 1 to be plated. FIG. 6 is a flow chart illustrating the bulge forming process of the plating method according to the third embodiment, and FIG. 7 is an explanatory view illustrating the bulge forming process of the plating method according to the third embodiment. As shown in FIG. 7, the bulge forming process S21 includes a first-layer forming process S211, a second-layer forming process (a semi-hardened-layer forming process) S212, and a third-layer forming process (a completely-hardened-layer forming process) S213.

The first-layer forming process S211 is a process identical to the bulge forming process S1 of the first embodiment. In the first-layer forming process S211, ink drops of first UV-curable ink are ejected from an inkjet head (a first inkjet head) 10 such that the ejected ink drops land on the object 1. Thereafter, the first UV-curable ink is completely hardened by irradiation with ultraviolet light from an ultraviolet-light radiating unit 11. At this time, immediately after the first UV-curable ink lands on the object 1, hardening using irradiation with ultraviolet light starts. Since hardening using irradiation with ultraviolet light starts before the first UV ink dots sufficiently spread, a first layer 161 may completely harden before it sufficiently flattens. In this case, as shown in FIG. 7, the surface of the first layer 161 has fine irregularities.

The second-layer forming process S212 is a process of forming a second layer (a semi-hardened layer) 162 to be a part of the bulge 16 on the object 1 by ejecting ink drops of the first UV-curable ink from the inkjet head (the first inkjet head) 10 such that the ejected ink drops land on the first layer 161 formed on the object 1 while semi-hardening the first UV-curable ink. Here, semi-hardening means, for example, hardening the UV-curable ink by irradiation with ultraviolet light having relatively low intensity incapable of completely hardening the UV-curable ink such that the ink becomes a viscoid state. For example, when the intensity of ultraviolet light for completely hardening the ink is 100%, the intensity of ultraviolet light for semi-hardening the ink is set typically between 15% and 35%, preferably, between 20% and 30%, for example, about 23% (this is also applied to the following description).

In the second-layer forming process S212, the first UV-curable ink is ejected so as to land on the first layer 161 of the object 1, and is irradiated with ultraviolet light having relatively low intensity than that in the first-layer forming process S211 from the ultraviolet-light radiating unit 11, such that the first UV-curable ink semi-hardens. Therefore, after landing on the surface of the first layer 161, the first UV-curable ink to form a second layer 162 hardens relatively slowly. Therefore, after the first UV-curable ink fills the fine recesses in the surface of the first layer 161, thereby leveling the surface of the first layer 161 (leveling in the horizontal direction), the first UV-curable ink is semi-hardened, whereby the second layer 162 is formed. Therefore, it is possible to smoothly form the surface of the second layer 162.

The third-layer forming process S213 is a process of forming a third layer 163 to be a part of the bulge 16 on the object 1 by ejecting ink drops of the first UV-curable ink from the inkjet head (the first inkjet head) 10 such that the ejected ink drops land on the second layer 162 formed on the object 1 while completely hardening the first UV-curable ink. In the third-layer forming process S213, after the first UV-curable ink land on the second layer 162 of the object 1, ultraviolet light having relatively high intensity than that in the second-layer forming process S212 is radiated from the ultraviolet-light radiating unit 11, whereby the first UV-curable ink and the semi-hardened second layer 162 are completely hardened. In this way, the second layer 162 and the third layer 163 are completely hardened, thereby forming the bulge 16 on the object 1 together with the first layer 161. Also, as described above, since the surface of the second layer 162 is formed so as to be smooth, the third layer 163 which is the outermost layer of the bulge 16 also is formed so as to be smooth. Therefore, by plating the object 1 in the subsequent plating process S25, it is possible to improve the shiny appearance (glossy appearance) of the plated part. The bulge forming process S21 is also be called glossy printing.

The heating process S22 is a process of heating the object 1 having the bulge 16, thereby removing the internal stress of the bulge 16. In the heating process S22, for example, the object 1 is heated in a heating chamber (not shown in the drawings). In the heating process S22, the object 1 is heated at a predetermined temperature for a predetermined heating time, and then is cooled for a predetermined cooling time until the temperature of the object 1 sufficiently lowers.

With respect to the predetermined temperature, a lower limit is set to such a temperature that it is possible to heat the object 1 such that the internal stress of the bulge is sufficiently removed. The lower limit of the predetermined temperature is 45° C. Also, with respect to the predetermined temperature, an upper limit is determined on the basis of the heat resistant temperature of the object and the glass-transition temperature of the first UV-curable ink. In a case where the object 1 is made of an ABS resin or in a case where the object is made of a synthetic resin containing an ABS resin as a material, the heat resistant temperature of the object 1 is about 100° C. It is preferable that the predetermined temperature be a temperature lower than the glass-transition temperature of the first UV-curable ink. It is more preferable that the predetermined temperature is between a temperature lower than the glass-transition temperature of the first UV-curable ink by 40° C. and a temperature lower than the glass-transition temperature by 15° C. It is the most preferable that the predetermined temperature is between a temperature lower than the glass-transition temperature of the first UV-curable ink by 35° C. and a temperature lower than the glass-transition temperature by 10° C.

The predetermined heating time needs only to be such a time that it is possible to heat the object 1 such that the internal stress of the bulge 16 is sufficiently removed (for example, 4 hours). Also, the predetermined cooling time needs only to be such a cooling time that the internal stress of the bulge 16 of the object 1 can be removed as much as possible (for example, about 20 hours). Since the object 1 needs only to be cooled to a temperature which does not influence the subsequent processes, cooling of the object 1 may be performed by natural heat dissipation or a cooling apparatus.

In the above-described way, it is possible to remove the residual internal stress of the bulge 16 in advance before the subsequent plating process S25. In the plating method according to the third embodiment, especially, in the third-layer forming process S213 of the bulge forming process S21, since the first UV-curable ink to form the third layer 163 and the semi-hardened second layer 162 are completely hardened at the same time by irradiation with ultraviolet light, relatively large internal stress is likely to remain in the bulge 16. For this reason, if the temperature of the object 1 rises in the plating process S25, the internal stress of the bulge 16 is released, whereby the bulge 16 may be deformed. Such deformation may cause the coating layer to partially peel off from the surface of the object 1. However, if the internal stress of the bulge 16 is removed in advance before the plating process S25, it is possible to suppress such deformation of the bulge 16.

In the roughening process S23, the surface P1 of the object 1 having the bulge 16 formed thereon is roughened. The surface P1 (see FIG. 2) includes the first surface P1*a* (see FIG. 2) and the second surface P1*b* (see FIG. 2). The roughening process S23 is identical to the roughening process S2 of the first embodiment, and thus will not be described.

In the catalyst adding process S24, the catalyst C is attached to the object 1 having the bulge 16 and subjected to roughening. The catalyst adding process S24 also is identical to the catalyst adding process S3 of the first embodiment, and thus will not be described.

In the plating process S25, the object 1 having the bulge 16 and having the catalyst C attached thereon is plated. The plating process S25 also is identical to the plating process S4 of the first embodiment, and thus will not be described.

In the fixing process S26, the plated object 1 is heated in a heating chamber (not shown in the drawings), whereby the coating is fixed to the object 1. However, in a case where the adhesion of the coating to the object 1 is sufficiently secured in the plating process S25, after the plating solution is washed, the object may be dried, without performing the fixing process S26.

As described above, the plating method according to the third embodiment further includes the heating process S22 of heating the object 1 having the bulge 16 formed thereon, thereby removing the internal stress of the bulge 16, after the bulge forming process S21 and before the plating process S25.

According to this configuration, it is possible to remove the residual internal stress of the bulge 16 formed in the bulge forming process S21, in advance, before the plating process S25. In the plating process S25, releasing of the internal stress attributable to a rise in the temperature of the object 1 may deform the bulge 16. Such deformation may cause the coating layer to partially peel off from the object 1. However, by performing the heating process, it is possible to suppress such deformation.

Also, in the heating process S22, the object 1 is heated at a predetermined temperature lower than the glass-transition temperature of the first UV-curable ink.

In the heating process S22, if the temperature of the first UV-curable ink becomes equal to or higher than the glass-transition temperature, the bulge 16 may be deformed. However, according to the above-described configuration, it is possible to keep the bulge in a desired shape.

Also, the bulge forming process S21 includes the second-layer forming process (the semi-hardened-layer forming process) S212 of semi-hardening the first UV-curable ink by irradiation with ultraviolet light, thereby forming the semi-hardened second layer (the semi-hardened layer) 162, and the third-layer forming process (the completely-hardened-layer forming process) S213 of completely hardening the second layer 162 and the first UV-curable ink attached on the second layer 162, thereby forming the completely hardened layer (the layer composed of the second layer 162 and the third layer 163) by irradiation with ultraviolet light having intensity higher than that in the second-layer forming process S212.

According to this configuration, since it is possible to form the second layer 162 so as to be smooth by semi-hardening the first UV-curable ink, it is possible to form the completely hardened layer so as to be smooth by completely hardening the second layer 162 and the first UV-curable ink attached on the second layer 162 at the same time. As a result, it is possible to improve the shiny appearance (glossy appearance) of the plated bulge 16. Also, in the case of completely hardening the second layer 162 and the first UV-curable ink attached on the second layer 162 at the same time, the internal stress of the bulge 16 is likely to remain. However, if the heating process S22 is performed before the plating process S25, thereby removing the internal stress of the bulge 16 in advance, it is possible to suppress the internal stress from causing the coating to partially peel off. In other words, the heating process S22 is suitable in a case of performing the bulge forming process S21 including the second-layer forming process (the semi-hardened-layer forming process) S212 and the third-layer forming process (the completely-hardened-layer forming process) S213.

According to the third embodiment, in the bulge forming process S21, the first layer 161, the second layer 162, and the third layer 163 are formed. However, a laminate of a plurality of first layers may be formed. Also, the first-layer forming process S211 may be omitted.

According to the third embodiment, after the bulge forming process S21, the heating process S22 is performed. However, the heating process S22 may be performed after the roughening process S23.

In the third embodiment, the mask forming process S12 and the mask removing process S16 of the plating method according to the second embodiment are not performed. However, the mask forming process S12 may be performed before the heating process S22, and the mask removing process S16 may be performed after the plating process S25.

Also, even in the third embodiment, instead of the bulge forming process S21, the bulge forming process S1 of the plating method according to the first embodiment may be performed. In other words, even in the third embodiment, when the bulge 16 is formed, the second-layer forming process (the semi-hardened-layer forming process) S212 and the third-layer forming process (the completely-hardened-layer forming process) S213 may be omitted. Also, in the first embodiment, instead of the bulge forming process S1, the bulge forming process S21 may be performed, and in the second embodiment, instead of the bulge forming process S11, the bulge forming process S21 may be performed.

What is claimed is:

1. A plating method comprising:
 a bulge forming process of forming a bulge on an object to be plated by ejecting first ink drops of first UV-curable ink from a first inkjet head such that the ejected first ink drops land on the object; and
 a plating process of plating the object having the bulge formed thereon, after the bulge forming process;
 wherein, in the bulge forming process, the bulge is formed such that a second surface of the bulge to be plated has surface roughness different from that of a first surface of the object to be plated, and the first surface of the object to be plated has a different glossiness than the second surface of the bulge to be plated.

2. The plating method according to claim 1, further comprising:
 a heating process of heating the object having the bulge formed thereon, thereby removing an internal stress of the bulge, after the bulge forming process and before the plating process.

3. The plating method according to claim 2, wherein:
 in the heating process, the object is heated at a temperature lower than a glass-transition temperature of the first UV-curable ink.

4. A plating method comprising:
 a bulge forming process of forming a bulge on an object to be plated by ejecting first ink drops of first UV-curable ink from a first inkjet head such that the ejected first ink drops land on the object;
 a mask forming process of forming a plating mask on the object by ejecting second ink drops of second UV-curable ink from a second inkjet head such that the ejected second ink drops land on the object;
 a plating process of plating the object having the bulge formed thereon, after the bulge forming process; and
 a mask removing process of removing the plating mask from the object, after the plating process, wherein the plating mask is formed to be spaced apart from the neighboring bulge by a predetermined distance,
 and in the mask removing process, the plating mask is removed using an organic solvent for mask removal, in which the first UV-curable ink is insoluble in the organic solvent and the second UV-curable ink is soluble in the organic solvent.

5. The plating method according to claim 4, wherein:
 in the plating process, the object is dipped in a plating solution, wherein
 the first UV-curable ink is insoluble in the plating solution and the organic solvent for mask removal, and
 the second UV-curable ink is insoluble in the plating solution but is soluble in the organic solvent for mask removal.

6. The plating method according to claim 4, wherein in the plating process, the plating is applied to a portion of the bulge including an edge part where the plating mask is not formed.

7. The plating method according to claim 4, further comprising:
 a heating process of heating the object having the bulge formed thereon, thereby removing an internal stress of the bulge, after the bulge forming process and before the plating process.

8. The plating method according to claim 7, wherein:
 in the heating process, the object is heated at a temperature lower than a glass-transition temperature of the first UV-curable ink.

9. A plating method comprising:
 a bulge forming process of forming a bulge on an object to be plated by ejecting first ink drops of first UV-curable ink from a first inkjet head such that the ejected first ink drops land on the object; and
 a plating process of plating the object having the bulge formed thereon, after the bulge forming process;
 wherein the bulge forming process includes:
  a semi-hardened-layer forming process of semi-hardening the first ink drops landed on the object by irradiation with ultraviolet light, thereby forming a semi-hardened layer; and
  a completely-hardened-layer forming process of further ejecting the first ink drops to land on the semi-hardened layer, and completely hardening the semi-hardened layer and the first ink drops landed on the semi-hardened layer at the same time by irradiation with ultraviolet light having intensity higher than that in the semi-hardened-layer forming process, thereby forming a completely hardened layer;
 wherein, in the bulge forming process, the bulge is formed such that a second surface of the bulge to be plated has surface roughness different from that of a first surface of the object to be plated, and the first surface of the object to be plated has a different glossiness than the second surface of the bulge to be plated.

10. The plating method according to claim 9, further comprising:
 a heating process of heating the object having the bulge formed thereon, thereby removing an internal stress of the bulge, after the bulge forming process and before the plating process.

11. The plating method according to claim 10, wherein:
 in the heating process, the object is heated at a temperature lower than a glass-transition temperature of the first UV-curable ink.

* * * * *